United States Patent
Li

(10) Patent No.: US 9,956,890 B2
(45) Date of Patent: May 1, 2018

(54) DEVICE FOR CONTROLLING ELECTRIC AUTOMOBILE

(71) Applicant: Guodong Li, Fuji (JP)

(72) Inventor: Guodong Li, Fuji (JP)

(73) Assignee: NTN CORPORATION, Osaka (JP)

( * ) Notice: Subject to any disclaimer, the term of this patent is extended or adjusted under 35 U.S.C. 154(b) by 0 days. days.

(21) Appl. No.: 14/943,733

(22) Filed: Nov. 17, 2015

(65) Prior Publication Data

US 2016/0068079 A1 Mar. 10, 2016

Related U.S. Application Data

(63) Continuation of application No. PCT/JP2014/063001, filed on May 15, 2014.

(30) Foreign Application Priority Data

May 21, 2013 (JP) ................. 2013-106939

(51) Int. Cl.
*B60L 15/20* (2006.01)
*B60L 11/18* (2006.01)
(Continued)

(52) U.S. Cl.
CPC ............. *B60L 15/20* (2013.01); *B60L 3/0061* (2013.01); *B60L 7/14* (2013.01); *B60L 7/26* (2013.01);
(Continued)

(58) Field of Classification Search
None
See application file for complete search history.

(56) References Cited

U.S. PATENT DOCUMENTS

| 6,335,605 | B1 | 1/2002 | Negoro |
| 7,235,937 | B2 | 6/2007 | Takai et al. |

(Continued)

FOREIGN PATENT DOCUMENTS

| CN | 101234609 A | 8/2008 |
| JP | 61-132088 | 6/1986 |

(Continued)

OTHER PUBLICATIONS

Chinese Office Action dated Aug. 31, 2016 in corresponding Chinese Patent Application No. 201480028849.8.

(Continued)

*Primary Examiner* — Mussa A Shaawat
*Assistant Examiner* — Kyung J Kim

(57) ABSTRACT

An electric vehicle includes a motor, an ECU, and an inverter device. A motor control module of the inverter device includes: a parameter map having motor parameters stored therein; an open loop control section to generate control variables in open loop control by a voltage equation using the parameters stored in the parameter map, in response to a torque command from the ECU; a current feedback control section to perform control to eliminate a deviation relative to a command current value generated in an inverter, in response to the torque command from the ECU; and a hybrid control section to control the motor on the basis of control variables which are generated on the basis of the control variables generated by the open loop control section and control variables generated by the current feedback control section.

7 Claims, 6 Drawing Sheets

(51) Int. Cl.
  *B60L 3/00*   (2006.01)
  *B60L 7/14*   (2006.01)
  *B60L 7/26*   (2006.01)
  *B60L 15/02*  (2006.01)
  *H02P 21/06*  (2016.01)
  *H02P 21/22*  (2016.01)

(52) U.S. Cl.
  CPC ....... *B60L 11/1803* (2013.01); *B60L 11/1877* (2013.01); *B60L 11/1879* (2013.01); *B60L 15/025* (2013.01); *B60L 15/2009* (2013.01); *H02P 21/06* (2013.01); *H02P 21/22* (2016.02); *B60L 2210/40* (2013.01); *B60L 2220/14* (2013.01); *B60L 2220/44* (2013.01); *B60L 2220/46* (2013.01); *B60L 2240/14* (2013.01); *B60L 2240/421* (2013.01); *B60L 2240/423* (2013.01); *B60L 2240/425* (2013.01); *B60L 2240/427* (2013.01); *B60L 2240/429* (2013.01); *B60L 2240/527* (2013.01); *B60L 2240/529* (2013.01); *B60L 2240/80* (2013.01); *B60L 2250/26* (2013.01); *B60L 2260/26* (2013.01); *B60L 2260/28* (2013.01); *Y02T 10/643* (2013.01); *Y02T 10/7005* (2013.01); *Y02T 10/705* (2013.01); *Y02T 10/7241* (2013.01); *Y02T 10/7275* (2013.01)

(56) References Cited

U.S. PATENT DOCUMENTS

| | | |
|---|---|---|
| 7,816,874 B2 | 10/2010 | Matsuzaki et al. |
| 8,364,349 B2 | 1/2013 | Ueda et al. |
| 9,031,724 B2 | 5/2015 | Ozaki |
| 2006/0061310 A1 | 3/2006 | Takai et al. |
| 2008/0211433 A1 | 9/2008 | Matsuzaki et al. |
| 2009/0237021 A1 | 9/2009 | Yamamoto et al. |
| 2010/0280714 A1 | 11/2010 | Ueda et al. |
| 2012/0139460 A1* | 6/2012 | Senkou ............... H02P 21/0096 318/400.02 |
| 2013/0320747 A1* | 12/2013 | Ozaki .................. B60L 3/0061 301/6.5 |
| 2013/0338866 A1 | 12/2013 | Ozaki |

FOREIGN PATENT DOCUMENTS

| | | |
|---|---|---|
| JP | 11-150996 | 6/1999 |
| JP | 2003-219699 | 7/2003 |
| JP | 2006-094588 | 4/2006 |
| JP | 2011-004541 | 1/2011 |
| JP | 2012-178919 | 9/2012 |
| WO | WO2009/087991 A1 | 7/2009 |

OTHER PUBLICATIONS

PCT International Preliminary Report on Patentability dated Dec. 3, 2015 in corresponding International Patent Application No. PCT/JP2014/063001.

Japanese Office Action dated Mar. 21, 2017 from Japanese Patent Application No. 2013-106939, 4 pages.

Chinese Office Action dated Mar. 20, 2017 from Chinese Patent Application No. 201480028849.8, 3 pages.

Extended European Search Report dated Jan. 5, 2017 in corresponding European Patent Application No. 14801448.3.

International Search Report dated Aug. 19, 2014 in corresponding international application PCT/JP2014/063001.

Communication pursuant to Article 94(3) dated Dec. 1, 2017 in corresponding European Patent Application No. 14 801 448.3, 5 pages.

* cited by examiner

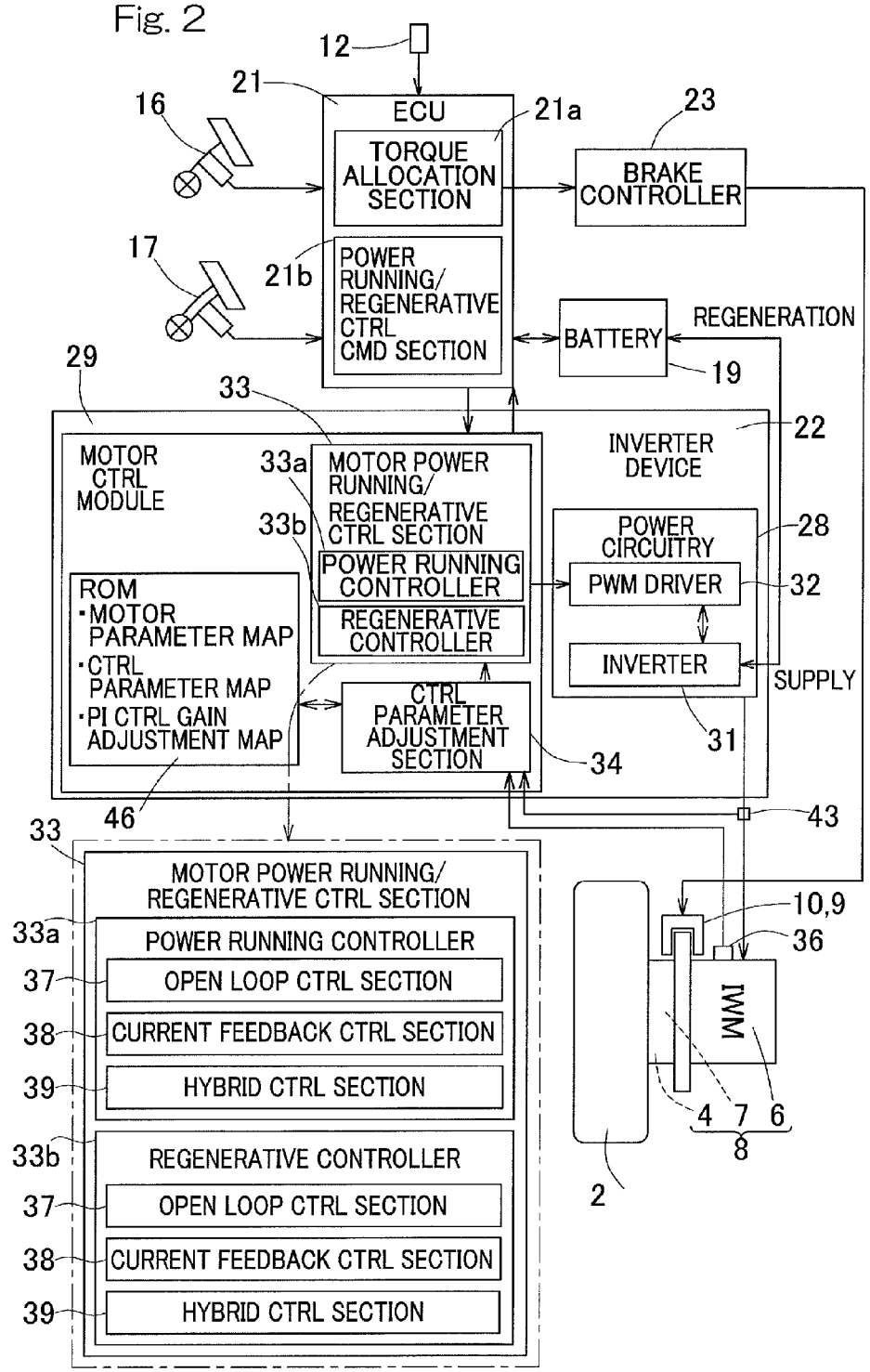

| T \ N | Rot_0 | Rot_1 | ... | Rot_m |
|---|---|---|---|---|
| Trq0 | $(R, Ld, Lq, Ke)\_00$ | $(R, Ld, Lq, Ke)\_01$ | ... | $(R, Ld, Lq, Ke)\_0m$ |
| Trq1 | $(R, Ld, Lq, Ke)\_10$ | $(R, Ld, Lq, Ke)\_11$ | ... | $(R, Ld, Lq, Ke)\_1m$ |
| ... | ... | ... | ... | ... |
| Trqn | $(R, Ld, Lq, Ke)\_n0$ | $(R, Ld, Lq, Ke)\_n1$ | ... | $(R, Ld, Lq, Ke)\_nm$ |

| T \ N | Rot_0 | Rot_1 | ... | Rot_m |
|---|---|---|---|---|
| Trq0 | $(\alpha do, \alpha dc, \gamma qo, \gamma qc)\_00$ | $(\alpha do, \alpha dc, \gamma qo, \gamma qc)\_01$ | ... | $(\alpha do, \alpha dc, \gamma qo, \gamma qc)\_0m$ |
| Trq1 | $(\alpha do, \alpha dc, \gamma qo, \gamma qc)\_10$ | $(\alpha do, \alpha dc, \gamma qo, \gamma qc)\_11$ | ... | $(\alpha do, \alpha dc, \gamma qo, \gamma qc)\_1m$ |
| ... | ... | ... | ... | ... |
| Trqn | $(\alpha do, \alpha dc, \gamma qo, \gamma qc)\_n0$ | $(\alpha do, \alpha dc, \gamma qo, \gamma qc)\_n1$ | ... | $(\alpha do, \alpha dc, \gamma qo, \gamma qc)\_nm$ |

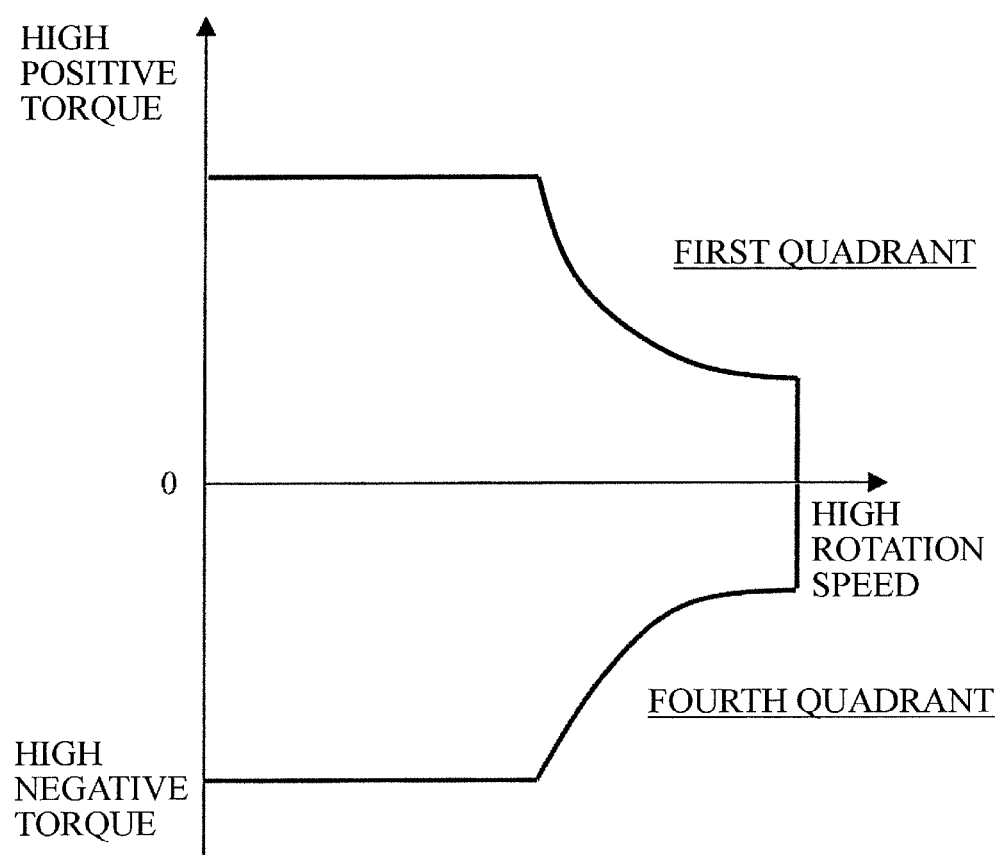

DEVICE FOR CONTROLLING ELECTRIC AUTOMOBILE

CROSS REFERENCE TO THE RELATED APPLICATION

This application is a continuation application, under 35 U.S.C. § 111(a), of international application No. PCT/JP2014/063001, filed May 15, 2014, which is based on and claims Convention priority to Japanese patent application No. 2013-106939, filed May 21, 2013, the entire disclosure of which is herein incorporated by reference as a part of this application.

BACKGROUND OF THE INVENTION

Field of the Invention

The present invention relates to, for example, a control device for a four-wheel electric vehicle including an in-wheel motor drive device, and particularly relates to a technique to control a motor on the basis of an open loop control method and a current feedback control method by a voltage equation for the motor in consideration of a parameter of the motor.

Description of Related Art

Hitherto, as a technique to control a motor, for example, a current feedback control method and a current open loop control method have been proposed.

Conventional Art 1 (Patent Document 1) <Current Feedback Control Method>

A control target torque command of output torque T is set in accordance with manipulation of an accelerator pedal by a driver of a vehicle. Next, d-axis and q-axis inductances are obtained beforehand on the basis of the set control target torque command, by using a motor output torque equation $T=p \times \{Ke \times Iq + (Ld-Lq) \times Id \times Iq\}$, and further by experimental measurement or the like, and a current command vector which is to be a control target for a current vector (Id, Iq) is set by using the values of the d-axis and q-axis inductances. A primary current Ia of the motor is controlled on the basis of the set current command vector, for each of d-axis and q-axis components thereof. As a control method, a method has been proposed in which, through PI feedback control, the value of an actual measured current vector (Id, Iq) of the motor is caused to coincide with the current command vector, thereby realizing the control target torque command as actual output torque T of the motor.

Conventional Art 2 (Patent Document 2) <Current Open Loop Control Method>

A method has been proposed in which all current sensors are removed for cost reduction and open loop control (forward control) is performed according to a motor circuit equation. In the proposed control method, an assist map in which torque T is associated with a current command vector is created beforehand, and a drive voltage is calculated by using a voltage circuit equation. The d-axis and q-axis inductances are handled as known parameters.

RELATED DOCUMENT

Patent Document

[Patent Document 1] JP Laid-open Patent Publication No. H11-150996
[Patent Document 2] WO2009/087991

SUMMARY OF THE INVENTION

In the conventional art 1, there is a possibility that the d-axis and q-axis inductances undesirably change due to influence of a change in current of the motor or the like. Thus, in current control, a problem such as overshoot arises, and hence the accuracy of torque control decreases. In the conventional art 2, there is a possibility that the d-axis and q-axis inductances undesirably change due to influence of a change in current of the motor or the like. Thus, only with open loop control, the accuracy of torque control decreases.

An object of the present invention is to provide a control device for an electric vehicle which control device is able to accurately perform torque control of a motor for wheel driving.

Hereinafter, in order to facilitate understanding of the present invention, the present invention will be described with reference to the reference numerals in embodiments for the sake of convenience.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 2 is a block diagram of a schematic configuration showing a relationship of an inverter device and the like of the electric vehicle;

FIG. 5 is a diagram schematically showing a motor parameter map of a control device for the electric vehicle;

FIG. 6 is a diagram schematically showing a control parameter map of the control device for the electric vehicle; and FIG. 7 is an N-T chart of a motor in the electric vehicle.

DESCRIPTION OF EMBODIMENTS

Figure 1:
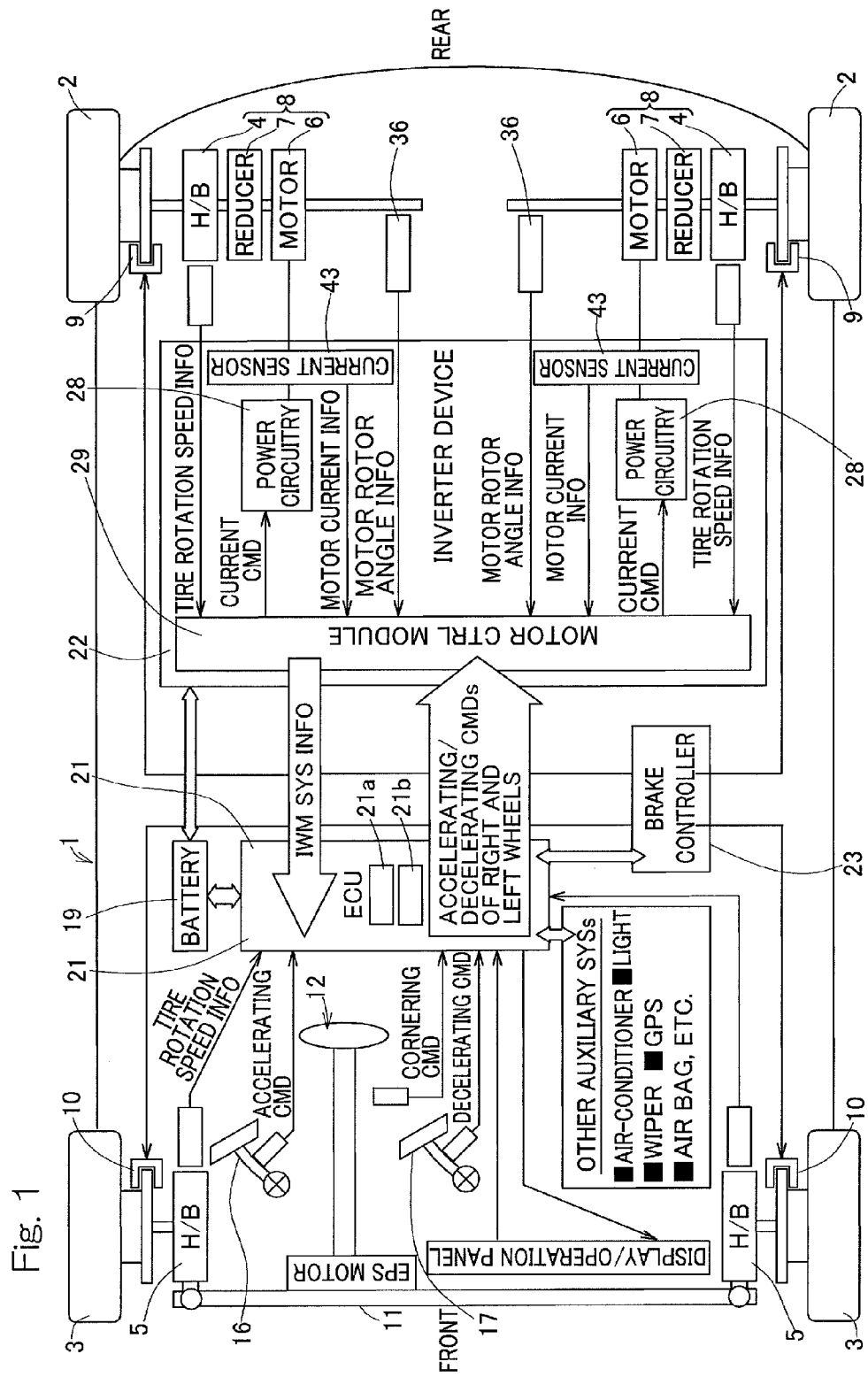
FIG. 1 is a block diagram of a schematic configuration showing an electric vehicle according to a first embodiment of the present invention in a plan view.

A control device for an electric vehicle according to a first embodiment of the present invention will be described with reference to FIGS. 1 to 7. The following description also includes a description of a method for controlling the electric vehicle. FIG. 1 is a block diagram of a schematic configuration showing the electric vehicle according to the embodiment in a plan view. As shown in FIG. 1, the electric vehicle is a four-wheel vehicle which includes a vehicle body 1 with right and left rear wheels 2 as drive wheels and with right and left front wheels 3 as driven wheels which are steering wheels. The drive wheels 2 and the driven wheels 3 are both equipped with tires and are supported by the vehicle body 1 via respective wheel bearings 4 and 5.

In FIG. 1, the wheel bearings 4 and 5 are labeled with "H/B" which is an abbreviation for hub bearing. The right and left drive wheels 2 are driven by respective independent traction motors 6. Rotation of each motor 6 is transmitted via a reducer or reduction gear 7 and the wheel bearing 4 to the corresponding wheel 2. The motor (IWM: In-Wheel Motor) 6, the reducer 7, and the wheel bearing 4 are integrally assembled with each other to form an in-wheel motor drive device 8. The in-wheel motor drive device 8 is partly or entirely disposed within the wheel 2. The reducer 7 is, for example, a cycloidal reducer. The wheels 2 and 3 are equipped with respective electromechanical brakes 9 and 10. The steering wheels 3, 3, which are the right and left front wheels, can be turned via a turning mechanism 11 and are steered with steering portion 12 such as a steering wheel.

FIG. 2 is a block diagram of a schematic configuration of an inverter device and the like of the electric vehicle. As shown in FIG. 2, the electric vehicle includes an ECU 21 which is an electric control unit configured to perform general control of the vehicle, and an inverter device 22 configured to perform control of the traction motors 6 according to commands from the ECU 21. The ECU 21 includes a computer, programs which are executed by the computer, and various electronic circuits. The ECU 21 includes a torque allocation section 21a and a power running/regenerative control command section 21b.

The torque allocation section 21a is configured to generate an accelerating/decelerating command as a torque command value, which is to be sent to the traction motors 6, 6 of the right and left wheels, on the basis of an accelerating command outputted from an accelerator manipulation portion 16 such as an accelerator pedal, a decelerating command outputted from brake manipulation portion 17 such as a brake pedal, and a cornering or steering command from the steering portion 12, and to output the accelerating/decelerating command to each inverter device 22. In addition, the torque allocation section 21a has a function to, in response to a decelerating command outputted from the brake manipulation portion 17, generate a braking torque command value allocated to regenerative braking of the motor 6 and a braking torque command value allocated to the operation of the electromechanical brakes 9 and 10. The braking torque command value allocated to regenerative braking reflects the accelerating/decelerating command which is to be sent to the motors 6 of the right and left wheels. The braking torque command value allocated to the operation of the brakes 9 and 10 is outputted to a brake controller 23. The power running/regenerative control command section 21b is configured to send a command flag for switching between acceleration (power running) and deceleration (regeneration), to a motor power running/regenerative control section 33 of a motor control module 29 described later.

The inverter device 22 includes a power circuitry 28 provided for each motor 6, and the motor control module 29 configured to control the power circuitry 28. The power circuitry 28 includes an inverter 31 configured to convert a DC power from a battery 19 into a three-phase AC power used for power running and regeneration of the motor 6, and a PWM driver 32 configured to control the inverter 31. The motor 6 is, for example, a three-phase synchronous motor. The motor 6 is provided with a rotation angle sensor 36 configured to detect a rotation angle as an electrical angle of a rotor of the motor. The inverter 31 includes a plurality of semiconductor switching elements, and the PWM driver 32 performs pulse width modulation of an inputted current command and sends ON/OFF commands to each of the semiconductor switching elements.

The motor control module 29 includes a computer, programs which are executed by the computer, and various electronic circuits. The motor control module 29 includes the motor power running (drive)/regenerative control section 33 as a basic control section, and a control parameter adjustment section 34. The motor power running/regenerative control section 33 is configured to perform conversion of an accelerating (power running)/decelerating (regeneration) command such as a torque command sent from the ECU 21 which is a primary control unit, and send the current command to the PWM driver 32 of the power circuitry 28. Switching between acceleration (power running) and deceleration (regeneration) is performed on the basis of the command flag from the power running/regenerative control command section 21b of the ECU 21. The motor power running/regenerative control section 33 includes power running controller 33a and regenerative controller 33b, and either the power running controller 33a or the regenerative controller 33b is selectively used on the basis of the command flag from the power running/regenerative control command section 21b.

The motor power running/regenerative control section 33 generates a command current value for the motor 6 on the basis of the torque command sent from the ECU 21 and the command flag from the power running/regenerative control command section 21b, by using a torque map which is preset in the inverter. Along with the generation of the command current value, the motor power running/regenerative control section 33 also generates the following parameters (R, Ld, Lq, Ke) on the basis of a characteristic parameter map of the motor 6.

R: motor resistance
Ld: d-axis inductance of the motor
Lq: q-axis inductance of the motor
Ke: effective value of motor induced voltage constant Here, by the control parameter adjustment section 34, current control is performed at a predetermined ratio according to two types of control methods. The two types of control methods are a later-described open loop control method with a voltage equation, and a later-described current feedback control method. The motor control module 29 can control a ratio between influence of open loop control and influence of current feedback control by adjusting control parameters ($\alpha$do, $\alpha$dc, $\gamma$qo, and $\gamma$qc in the present embodiment) with the control parameter adjustment section 34. In the current feedback control method, the rotation angle of the rotor of the motor 6 is obtained from the rotation angle sensor 36, and control corresponding to the rotation angle, such as vector control, is performed.

Each of the power running controller 33a and the regenerative controller 33b includes an open loop control section 37, a current feedback control section 38, and a hybrid control section 39. In response to the torque command from the ECU 21, the open loop control section 37 generates control variables in open loop control by the above-described voltage equation using the parameters (R, Ld, Lq, Ke) stored in the parameter map of the motor 6. In response to the torque command from the ECU 21, the current feedback control section 38 performs control so as to eliminate a deviation relative to the command current value generated in the inverter. The hybrid control section 39 controls the motor 6 on the basis of new control variables which are generated on the basis of the control variables generated by the open loop control section 37 and the control variables generated by the current feedback control section 38. Signal communication among the ECU 21, the inverter device 22, the brake controller 23, and the steering portion 12 is performed, for example, with controller area network (CAN) communication.

Figure 3A:
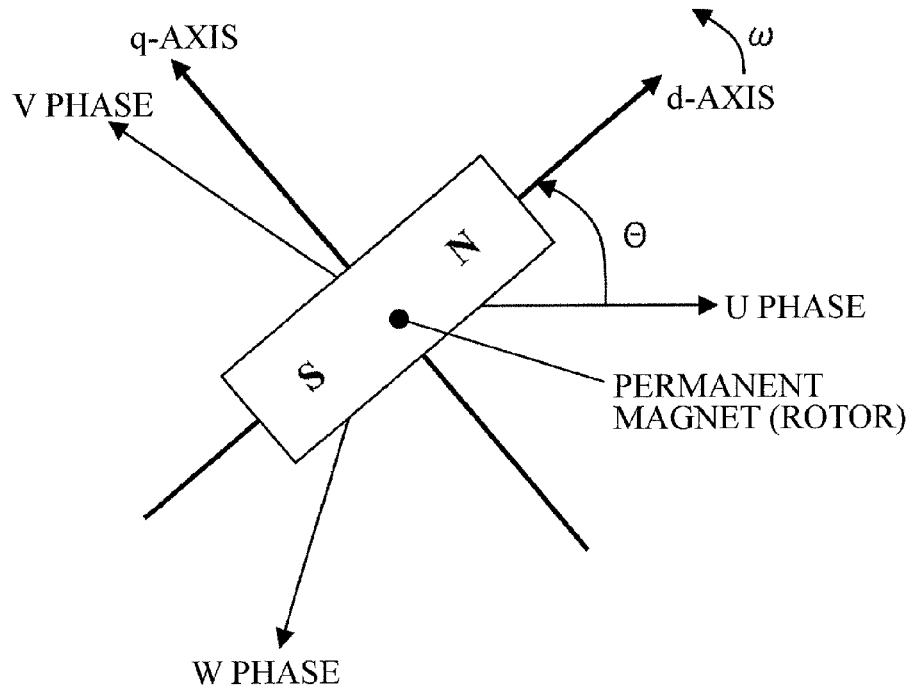
FIGS. 3A and 3B are a schematic configuration diagrams of an IPM motor of the electric vehicle.

FIG. 3A is a schematic configuration diagram of an IPM (Interior Permanent Magnet) motor of the electric vehicle. As shown in FIG. 3A, in the case where the motor which drives the wheel is an IPM motor, that is, an interior permanent magnet synchronous motor, a magnetic resistance in the direction of a q-axis orthogonal to the direction of a d-axis which is a magnet axis is lower than that in the direction of the d-axis, thus the motor has a salient pole structure, and the q-axis inductance Lq becomes higher than the d-axis inductance Ld. Because of the saliency, reluctance torque Tr can be used in addition to magnetic torque Tm, so that large torque and high efficiency can be achieved. The magnet torque Tm is a torque generated by attraction and repelling of a magnetic field generated by a permanent magnet of a rotor and a rotating magnetic field generated by a winding. The reluctance torque Tr is a torque generated by a salient pole portion of the rotor being attracted to the teeth of the winding, which generates the rotating magnetic field, such that the magnetic resistance is decreased.

Figure 3B:
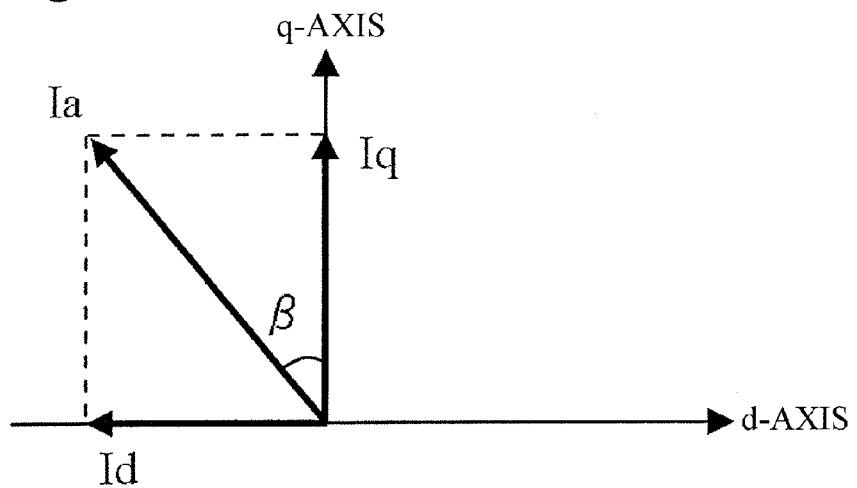

Total torque T generated by the motor is as follows.

$$T = p \times \{Ke \times Iq + (Ld - Lq) \times Id \times Iq\} = Tm + Tr$$

p: magnetic pole pair
Ld: d-axis inductance of the motor
Lq: q-axis inductance of the motor
Ke: effective value of motor induced voltage constant A vector control method is well-known in which, as shown in FIG. 3B, a primary current Ia flowing to the IPM motor is split into a q-axis current Iq which is a torque generation current and into a d-axis current Id which is a magnetic flux generation current, and the q-axis current Iq and the d-axis current Id can be independently controlled.

$$Id = -Ia \times \sin \beta$$

$$Iq = Ia \times \cos \beta$$

β: current advance angle

Figure 4:
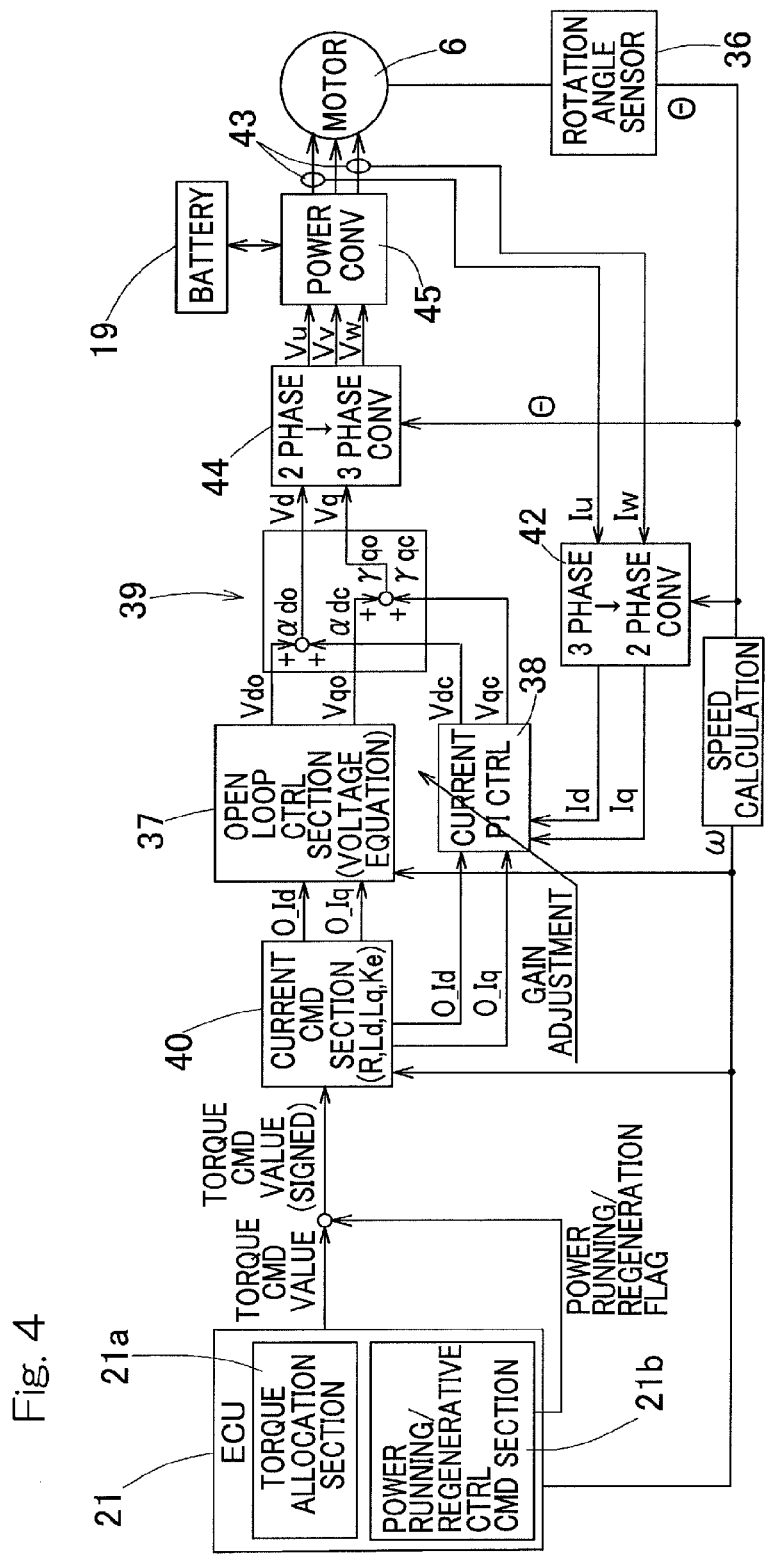
FIG. 4 is a block diagram of a torque control system of a motor control module of the electric vehicle.

FIG. 4 is a block diagram of a torque control system of the motor control module 29 of the electric vehicle. A description will be given also with reference to FIG. 2. The motor control module 29 is configured to control a motor drive current and includes a current command section 40. The current command section 40 generates an appropriate command current value, which drives the motor 6, by using the torque map (not shown), which is preset in the inverter, on the basis of a detection value of a drive current which is applied to the motor 6 and is detected by the rotation angle sensor 36 and of a torque command value which is an accelerating/decelerating command which is generated by the torque allocation section 21a of the ECU 21 and has a sign representing the direction of acceleration/deceleration, that is, the direction of the command current. Along with the generation of the command current value, the current command section 40 also generates the parameters (R, Ld, Lq, Ke) on the basis of the parameter map of the motor 6.

The hybrid control section 39 performs current control on the command current value by using the two types of control methods, open loop control and current feedback control, on the basis of the control parameters (αdo, αdc, γqo, γqc) obtained from the control parameter adjustment section 34, at a ratio by the control parameters, for example, with weighted averaging, in the present embodiment. The control parameter adjustment section 34 adjusts the control parameters (αdo, αdc, γqo, γqc) and also adjusts a gain parameter for PI control.

Regarding the torque map, an appropriate torque command value is calculated from a maximum torque control map on the basis of an accelerating signal and the rotation speed of the motor 6. The current command section 40 generates command values of a primary current (Ia) and a current phase angle (β) of the motor 6 on the basis of the calculated torque command value. The current command section 40 generates two command currents, a d-axis current (magnetic field component) O_Id and a q-axis current (torque component) O_Iq on the basis of the values of the primary current (Ia) and the current phase angle (β). Here, for the two command currents, the d-axis current O_Id and the q-axis current O_Iq, the hybrid control section 39 controls the actual currents Id and Iq of the motor 6 at the above-described ratio by using control variables obtained by a control method 1 which is the open loop control method and control variables obtained by a control method 2 which is the current feedback control method.

Control Method 1: Control Method with Open Loop Control

The open loop control section 37 generates control variables Vdo and Vqo by the following voltage equations using the parameters (R, Ld, Lq, Ke) stored in the parameter map of the motor 6.

$$Vdo = R \times O\_Id - \omega \times Lq \times O\_Iq$$

$$Vqo = R \times O\_Iq + \omega \times Ld \times O\_Id + Ke \times \omega$$

R: motor resistance
ω: motor angular speed (rad/s)

The parameter map of the motor 6 is created on the basis of results of a bench test and an actual vehicle test. The parameters (R, Ld, Lq, Ke) are measured values, and are values measured in consideration of information such as temperature change, current change, motor rotation speed change, or the like. The parameter map is recorded, for example, in a ROM 46 which is a storage or memory provided in the inverter device 22. The recorded parameter map includes a plurality of maps. When the parameter is obtained from the parameter map, the open loop control section 37 obtains parameters from the respective maps in accordance with a state of the vehicle, and calculates the average of the parameters and uses them.

The "state of the vehicle" indicates, for example, whether the vehicle is in a rapid acceleration or rapid deceleration state, during motor power running or regenerative control, or during running on an uphill road. The open loop control section 37 calculates the average of parameters obtained from the respective maps in accordance with the state of the vehicle which changes every moment, for example, by interpolation control. Thus, it is possible to ensure a storage area for the map, and it is also possible to reduce an arithmetic operation load.

Control Method 2: Control Method with Current Feedback Control

The current PI control section (current feedback control section) 38 calculates control variables Vd and Vq as voltage values by PI control on the basis of the values of the d-axis current O_Id and the q-axis current O_Iq outputted from the current command section 40 and later-described two-phase currents Id and Iq calculated by a three phase/two phase conversion section 42 on the basis of the motor current and the rotor angle, under adjustment of a PI control gain at the control parameter adjustment section 34 to which the two-phase currents Id and Iq and a rotor angle θ of the motor 6 are inputted (feedback control). The three phase/two phase conversion section 42 calculates a v-phase current (Iv), which is obtained by the following equation, Iv=−(Iu+Iw), on the basis of detection values of a u-phase current (Iu) and a w-phase current (Iw) of the motor 6 which are detected by current sensors 43, and converts the three-phase currents Iu, Iv, and Iw into two-phase currents Id and Iq. The rotor angle of the motor 6 which is used for the conversion is obtained from the rotation angle sensor 36. Control variables generated by the current PI control section 38 through current feedback control are denoted by Vdc and Vqc.

Invention method: The control variables generated by the control methods 1 and 2 are combined at the above-described ratio to generate new control variables Vd and Vq. The motor 6 is controlled on the basis of the new control variables Vd and Vq generated by the hybrid control section 39. The control variables Vd and Vq generated by the hybrid control section 39 are represented and calculated by the following equations.

$$Vd = \alpha do \times Vdo + \alpha dc \times Vdc$$

$$Vq = \gamma qo \times Vqo + \gamma qc \times Vqc$$

(note that αdx and γqx represent coefficients, x represents o or c, αdo+αdc=1, and γqo+γqc=1)

The control parameter adjustment section 34 adjusts the control parameters (αdo, αdc, γqo, γqc) and the PI control gain (a proportional gain and an integral gain). For example, there is a possibility that the d-axis and q-axis inductances of the motor 6 and the motor induced voltage constant effective value Ke change due to influence of disturbance such as current change. Thus, in the case of the open loop control method, when the parameters from the preset map are used, there is a possibility that the accuracy of torque control decreases. So the current feedback control section 38 compensates for the decrease of the control accuracy with PI feedback control.

A control parameter (αdo, αdc, γqo, γqc) map and a PI control gain adjustment map are created on the basis of results of a bench test and an actual vehicle test. As a map adjustment method by the control parameter adjustment section 34, for example, variations of the motor parameters (R, Ld, Lq, Ke) in the motor parameter map are great in a high-speed or large-torque region, and thus the values of αdo and γqo of the control parameters in the control parameter map are set to be lower than the values of αdc and γqc of the control parameters. On the other hand, in low-speed and small-torque regions for the motor parameter, the values of αdo and γqo of the control parameters are set to be higher than the values of αdc and γqc of the control parameters.

A two phase/three phase conversion section 44 converts the inputted two-phase control variables Vd and Vq generated by the hybrid control section 39, using the rotor angle θ of the motor 6 obtained by the rotation angle sensor 36, into three-phase PWM duties Vu, Vv, and Vw. A power conversion section 45 corresponds to the power circuitry 28 in FIG. 2, performs PWM control of the inverter 31 in accordance with the PWM duties Vu, Vv, and Vw, and drives the motor 6.

FIG. 5 is a diagram schematically showing a motor parameter map Ma of the control device for the electric vehicle. As shown in FIG. 5, motor parameters are obtained from the motor parameter map Ma in accordance with a rotation speed N and a torque T of the motor, and the motor is driven. In FIG. 5, Rot_0, Rot_1, . . . , Rot_m: respective rotation speeds Trq0, Trq1, . . . , Trqn: respective torque (the same applies to FIG. 6).

FIG. 6 is a diagram schematically showing a control parameter map Mb of the control device for the electric vehicle. As shown in FIG. 6, control parameters are obtained from the control parameter map Mb in accordance with the rotation speed N and the torque T of the motor, and the motor is driven.

FIG. 7 is an N-T (rotation speed-torque) chart of the motor in the electric vehicle. FIG. 7 shows the first quadrant and the fourth quadrant of the N-T chart of the motor. The first quadrant is an area in which power running control is performed, and positive torque occurs therein. The fourth quadrant is an area in which regenerative control is performed, and negative torque occurs therein.

Function and advantageous effects will be described. The motor control module 29 controls the power circuitry 28 on the basis of the accelerating/decelerating command, which is the torque command or the like sent from the ECU 21, during motor power running and regenerative control, and executes output of the motor 6 through torque control. Each open loop control section 37 in the power running controller 33*a* or the regenerative controller 33*b* generates control variables in open loop control by the voltage equation using the parameters stored in the parameter map Ma, in response to the torque command from the ECU 21. In addition, each current feedback control section 38 performs control so as to eliminate a deviation relative to the command current value generated in the inverter, in response to the torque command from the ECU 21.

The hybrid control section 39 controls the motor 6 on the basis of the new control variables which are generated on the basis of the control variables generated by the open loop control section 37 and the control variables generated by the current feedback control section 38. For example, there is a possibility that the d-axis and q-axis inductances of the motor 6 and the motor induced voltage constant effective value Ke change due to influence of disturbance such as current change. Thus, in the case of the open loop control method, when the parameters from the preset map are used, there is a possibility that the accuracy of torque control decreases. So the current feedback control section 38 can compensate for the decrease of the control accuracy with feedback control. In this manner, it is possible to improve the accuracy of torque control of the motor 6.

The control parameter adjustment section 34 adjusts the control parameters as appropriate, for example, in accordance with the motor rotation speed and torque which change every moment. The hybrid control section 39 can properly control the ratio between open loop control and current feedback control by the adjusted control parameters. The hybrid control section 39 can control the motor 6 during power running control or during regenerative control by the new control variables which are generated on the basis of the control variables generated by the open loop control section 37 and the control variables generated by the current feedback control section 38. Either during power running control of the motor 6 or during regenerative control of the motor 6, the hybrid control section 39 can improve the accuracy of torque control without causing a problem such as overshoot.

In another embodiment, for example, the map may be recorded in recording portion provided in the ECU. In the above-described embodiment, the case of application to an electric vehicle whose rear wheels are driven by the in-wheel motor devices has been described. However, the present invention is also applicable to an electric vehicle whose wheels are driven by motors disposed outside the wheels, such as an on-board type, in addition to an in-wheel motor type, as a type in which the wheels 2 are driven by respective motors. Furthermore, the present invention is applicable to an electric vehicle whose four wheels are driven by respective motors, or an electric vehicle whose wheels are driven for running by a single motor.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included within the scope.

REFERENCE NUMERALS

2 . . . wheel
4 . . . wheel bearing
6 . . . motor
7 . . . reducer
8 . . . in-wheel motor drive device
21 . . . ECU
28 . . . power circuitry
29 . . . motor control module
31 . . . inverter
34 . . . control parameter adjustment section
37 . . . open loop control section
38 . . . current feedback control section (current PI control section)
39 . . . hybrid control section

What is claimed is:

1. A control device for an electric vehicle including a motor configured to drive a wheel; an electric control unit (ECU) configured to perform general control of the vehicle, an inverter device including a power circuitry with an inverter configured to convert a direct current (DC) power to an alternating current (AC) power used to drive the motor, and a motor control module configured to control at least the power circuitry in accordance with control of the ECU, the motor control module comprising:
   a parameter map having characteristic parameters of the motor stored therein;
   an open loop control section configured to generate control variables $V_{do}$, $V_{qo}$ in open loop control by a voltage equation using the parameters stored in the parameter map, in response to a torque command from the ECU, wherein $V_{do}$ is a control variable in a direction of a direct axis (d-axis) which is a magnetic axis and $V_{qo}$ is a control variable in a direction of a direct axis (d-axis) which is a magnetic axis and $V_{qo}$ is a control variable in a direction of a quadrature axis (q-axis) orthogonal to the direction of the d-axis;
   a current feedback control section configured to generate control variables $V_{dc}$, $V_{qc}$ through current feedback control, in response to the torque command from the ECU, where $V_{dc}$ is a control variable in the direction of the d-axis and $V_{qc}$ is a control variable in the direction of the q-axis; and
   a hybrid control section configured to control the motor on the basis of control variables $V_d$, $V_q$ which are generated on the basis of the control variables $V_{do}$, $V_{qo}$ generated by the open loop control section and control variables $V_{dc}$, $V_{qc}$ generated by the current feedback control section,
   wherein control variables $V_d$, $V_q$ generated by the hybrid control section are represented and calculated by $V_d = \alpha_{do} \times V_{do} + \alpha_{dc} \times V_{dc}$, and $V_q = \gamma_{qo} \times V_{qo} + \gamma_{qc} \times V_{qc}$, where $\alpha_{dx}$ and $\gamma_{qx}$ represent coefficients, x represents o or c, $\alpha_{do} + \alpha_{dc} = 1$, and $\gamma_{qo} + \gamma_{qc} = 1$.

2. The control device for the electric vehicle as claimed in claim 1, wherein $V_{do}$, $V_{qo}$, $V_{dc}$ and $V_{qc}$ are voltage values.

3. The control device for the electric vehicle as claimed in claim 1, further comprising a control parameter adjustment section configured to adjust the control parameters $\alpha_{do}$, $\alpha_{dc}$, $\gamma_{qo}$, $\gamma_{qc}$.

4. The control device for the electric vehicle as claimed in claim 3, wherein in a high-speed or large-torque region where the characteristic parameters of the motor are set, values of $\alpha_{do}$ and $\gamma_{qo}$ of the control parameters are set to be lower than values of $\alpha_{dc}$ and $\gamma_{qc}$ of the control parameters; and
   in a low-speed or small-torque region where the characteristic parameter of the motor is set, the values of $\alpha_{do}$ and $\gamma_{qo}$ of the control parameters are set to be higher than the values of $\alpha_{dc}$ and $\gamma_{qc}$ of the control parameters.

5. The control device for the electric vehicle as claimed in claim 1, wherein the parameter map of the motor includes a plurality of maps, and
   when the parameter is obtained from the parameter map, the open loop control section obtains parameters from the respective maps in accordance with a state of the vehicle, and calculates an average of the parameters and uses the average.

6. The control device for the electric vehicle as claimed in claim 1, wherein the hybrid control section controls the motor during power running control or during regenerative control on the basis of the control variables which are generated on the basis of the control variables generated by the open loop control section and the control variables generated by the current feedback control section.

7. The control device for the electric vehicle as claimed in claim 1, wherein the motor constitutes a part of an in-wheel motor drive device which is partly or entirely disposed within the wheel and includes the motor, a wheel bearing, and a reducer.

* * * * *

UNITED STATES PATENT AND TRADEMARK OFFICE
CERTIFICATE OF CORRECTION

PATENT NO. : 9,956,890 B2
APPLICATION NO. : 14/943733
DATED : May 1, 2018
INVENTOR(S) : Guodong Li Page 1 of 1

It is certified that error appears in the above-identified patent and that said Letters Patent is hereby corrected as shown below:

On the Title Page

Item [*] (Notice), Line 13:
Delete "days. days." and insert -- days. --, therefore.

In the Claims

Column 9, Line 37:
In Claim 1, delete "wheel;" and insert -- wheel, --, therefore.

Column 9, Line 51:
In Claim 1, delete "wherein" and insert -- where --, therefore.

Column 9, Line 53-56:
In Claim 1, delete "and Vqo is a control variable in a direction of a direct axis (d-axis) which is a magnetic axis and Vqo is a control variable in a direction of a quadrature axis (q-axis) orthogonal to the direction of the d-axis;" and insert -- and Vqo is a control variable in a direction of a quadrature axis (q-axis) orthogonal to the direction of the d-axis; --, therefore.

Column 10, Line 23:
In Claim 3, delete "yqo," and insert -- yqo and --, therefore.

Signed and Sealed this
Thirty-first Day of July, 2018

Andrei Iancu
*Director of the United States Patent and Trademark Office*